July 25, 1939.  Ö. RISZDORFER  2,167,053
PHOTOGRAPHIC CAMERA BUILT INTEGRAL WITH AN ELECTRIC EXPOSURE METER
Filed March 5, 1937   3 Sheets-Sheet 1
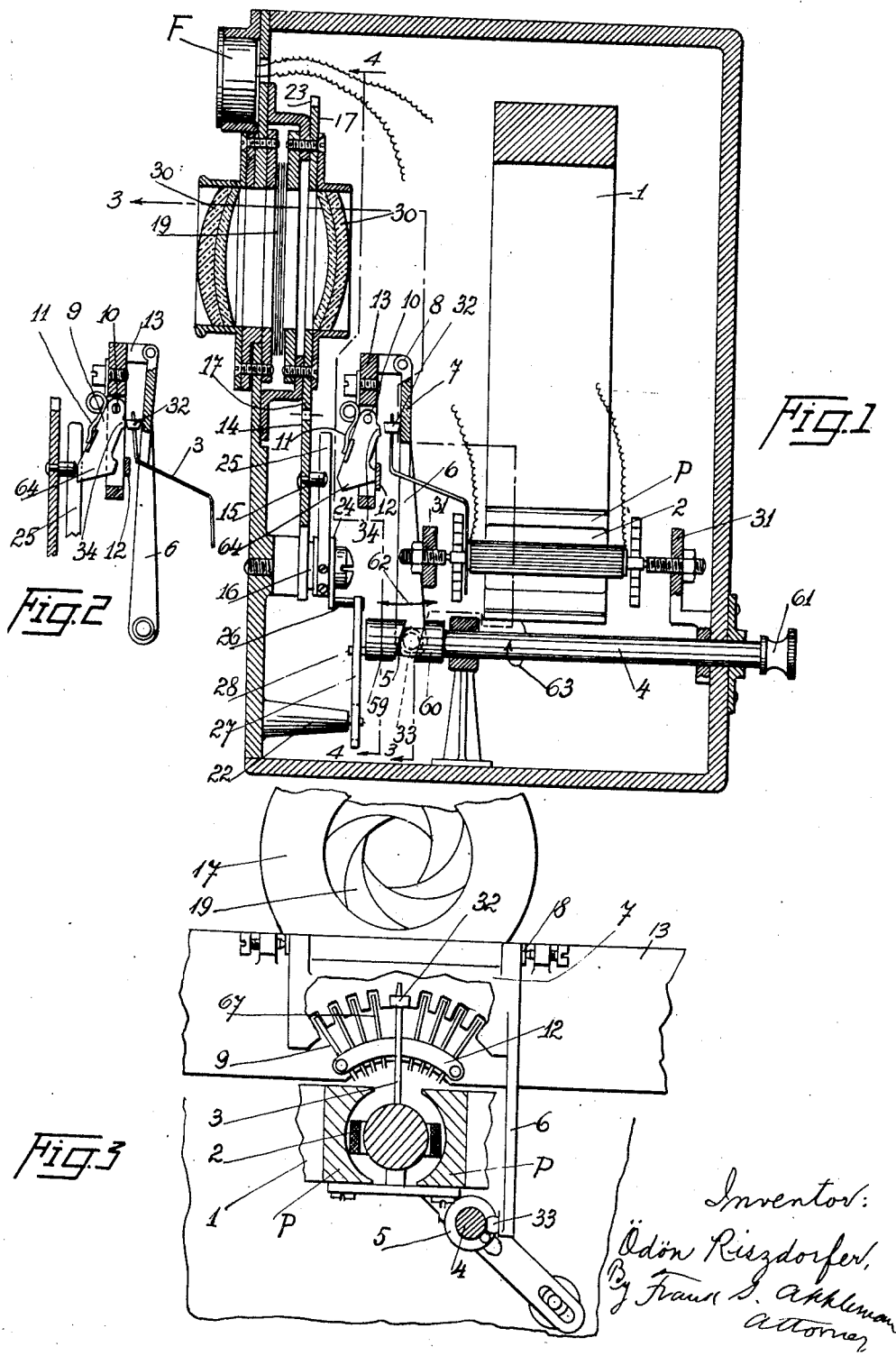

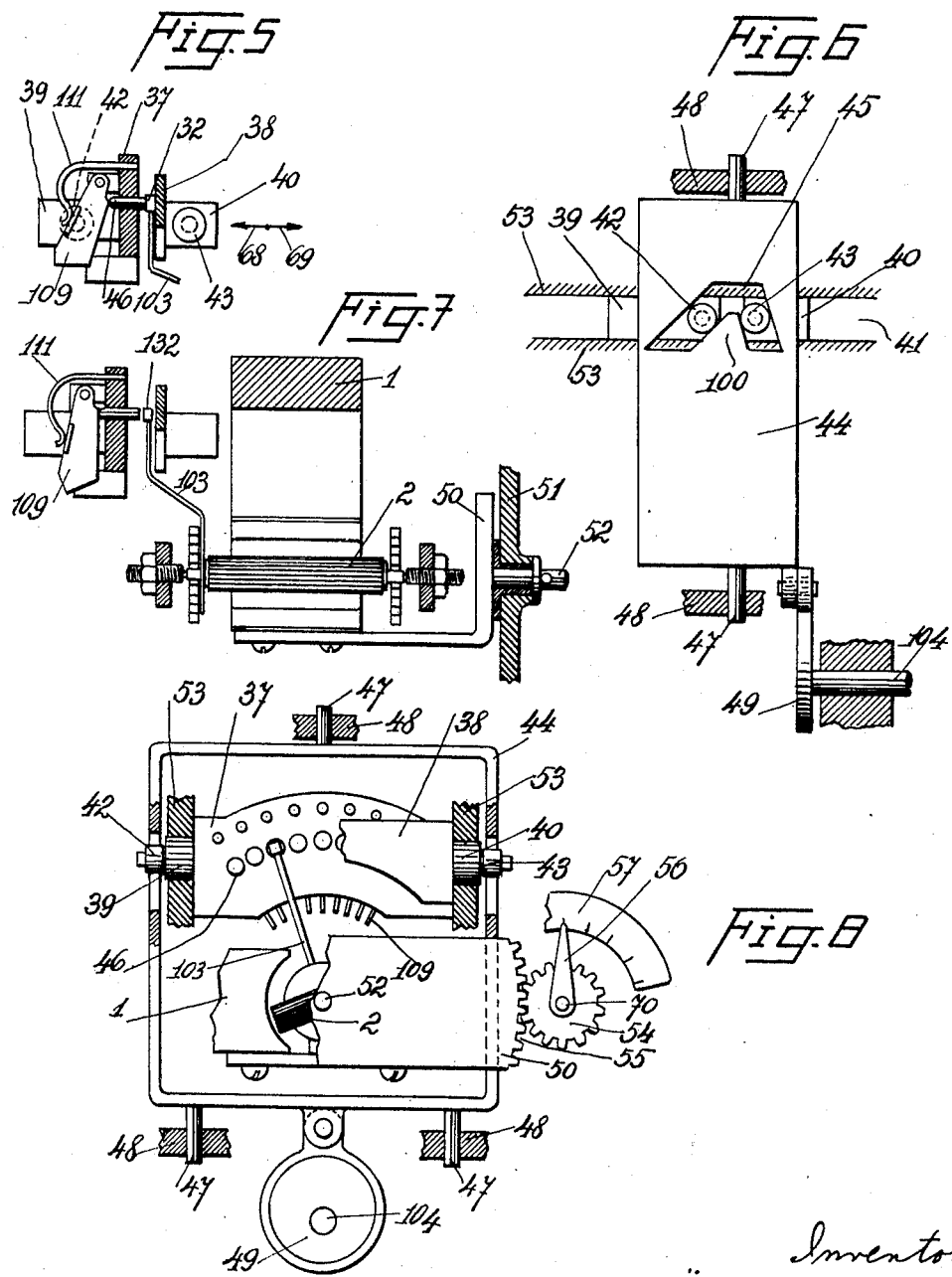

Patented July 25, 1939

2,167,053

UNITED STATES PATENT OFFICE 2,167,053

PHOTOGRAPHIC CAMERA BUILT INTEGRAL WITH AN ELECTRIC EXPOSURE METER

Ödön Riszdorfer, Budapest, Hungary

Application March 5, 1937, Serial No. 129,252
In Hungary March 7, 1936

13 Claims. (Cl. 95—64)

The invention relates to a photographic camera or cinematographic camera built integral with an electric exposure meter in which the diaphragm and/or the shutter speed are adjusted in each case in accordance with the indication of the electric exposure meter. This is accomplished in such a manner that the movable part of the electric exposure meter controls the position of a stop which stop determines, according to the position occupied by it at any time, the measure of the adjustment of the diaphragm and/or of the shutter speed. The known devices operating with a stop adjusted in accordance with the deflection of the pointer of the electric exposure meter present the drawback that the impact forces set up at the occasion of the adjustment place an undue stress upon the pointer which is of delicate construction and/or undue stresses are placed upon the coil of the measuring instrument.

This drawback is avoided in the arrangement according to the invention. In order to relieve the pointer and/or the setting mechanism of the electric exposure meter from any stresses due to jerks or the like, a movable intermediate member, serving as a stop in connection with the adjustment of the light control device is inserted, according to the invention, between the adjusting member of the electric measuring instrument, i. e., for instance the pointer, and the adjusting member of the light control device. The expression "light control device" is to be understood to cover the diaphragm of a photographic camera as well as the shutter, as both these members control the quantity of light to which the light-sensitive layer is exposed in a photographic camera.

A few embodiments of the invention are illustrated by the drawings, in which—

Fig. 1 shows a cross-section through the camera with the film handling apparatus omitted;

Fig. 2 is a fragmentary vertical section illustrating a detail;

Fig. 3 shows a section along the line 3—3 of Fig. 1;

Fig. 5 is a vertical section similar to Fig. 2 of a detail of a modification;

Fig. 6 is an enlarged elevation with parts shown in broken section of a further detail of the modification of Fig. 5;

Fig. 7 is a vertical section of various details of the modification and includes the structure of Fig. 5 with the parts in a different position; and Fig. 8 is an elevation with parts broken away and parts in broken section of the modification of Fig. 5.

Figure 4:
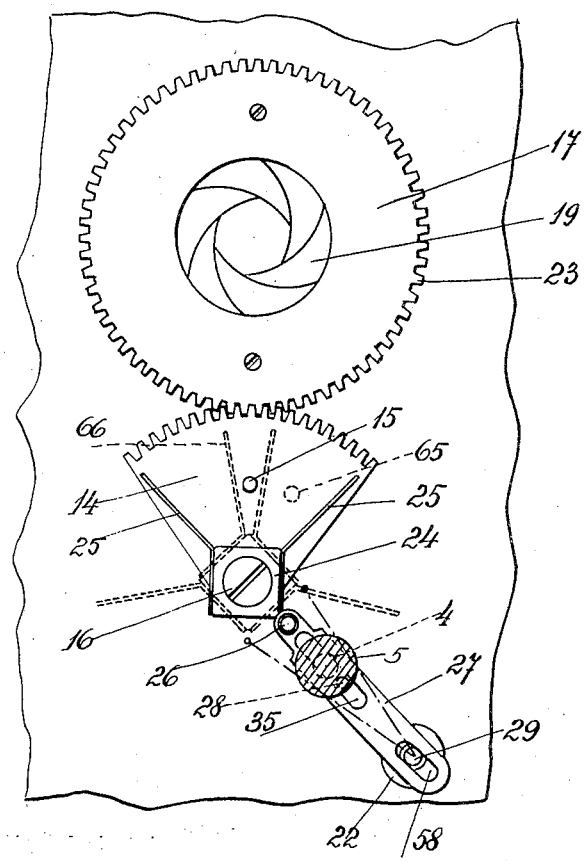
Fig. 4 shows a section along the line 4—4 of Fig. 1.

In the embodiment according to Figs. 1 to 4, 30, 30 denote the two halves of a symmetrical object lens of a camera. For the purpose of clarity, the film handling apparatus of the camera has been omitted as this forms no part of the invention and may comprise any or many of the well known different forms in current use. In the interior of the camera, the magnet 1 of the photoelectric measuring instrument is arranged behind the object lens, the coil 2 which is loaded with an arresting spring being supported between the poles P of the said magnet so as to be capable of oscillation in the bearings 31. The coil 2 is actuated by current impulses from the photo-cell F. The coil 2 carries a pointer 3 which is bent in the manner shown in Fig. 1, and which is fitted at its free end with a small block 32. Behind the block 32 there is provided a plate 7, supported in such a manner as to be capable of oscillating around its pivot 8 fixed on the carrying member 13. This plate 7 carries an arm 6, the lower end of which is fitted with a roller 33. This roller engages with a cam groove 5 provided between two jaws 59 and 60 on the rotatable shaft 4, which cam groove is in an oblique position relatively to the axis of the shaft. The shaft 4 can be rotated by hand by means of the knob 61 or by means of a clockwork (not shown), the arm 6 being moved to and fro by rotation of the shaft 4 in alternating directions in the plane of the drawing by means of the oblique groove 5, as indicated by the arrow 62. When the arm 6 is rocked toward the left (Fig. 1), the plate 7 will press against the block 32 and will press this block against the extension 34 of a small pawl 9. The pawl 9 is supported so as to be capable of oscillation around the pivot 10 which is fixed in the carrying member 13. In the position shown in Fig. 1, the pawl 9 is pressed by the spring 11 against the stop 12 fixed by means of bolts on the plate 13. A plurality—in the example assumed nine—of such pawls 9 are arranged in the manner of a fan in a cut-out opening of the carrying member 13, as shown by Fig. 3. The arrangement is such that the small extensions 34 of the pawls 9 are situated along a circular arc co-axial with the pointer 3. The pawls 9 are all identical and each of them is loaded with a special spring 11.

Opposite to the left-hand lower end (Fig. 1) of the pawl 9, a drive lug or pin 15 is provided in a segment 14. The segment 14 is supported so as to be capable of oscillating around a pivot 16 and is fitted with a set of teeth on its upper periphery. This set of teeth engages with the teeth 23 of a rear adjusting ring 17 of the iris diaphragm 19. Around the pivot 16, a collar 24 is arranged to be capable of oscillation with said segment 14 and carries two arms 25 made of plate springs which are, according to Fig. 4, bent to diverge outwardly from each other. The arms 25 are arranged in such a manner that in the case of a deflection of corresponding magnitude they will reach the lug 15. In other words, the lug 15 partly projects into the path of travel of the arms 25 (see Fig. 1). The collar 24 is pivotally connected with one end of an arm 27 by a pivot pin 26. In the arm 27, two spaced and alined longitudinally extending slots 35 and 58 are provided. Into the slot 35 there engages a pin 28 which is eccentrically fixed on the end of the shaft 4. Into the slot 58 there engages a pin 29 which is fixedly mounted on the free end of an inwardly extending member 22 mounted on the front wall of the camera. When the shaft 4 is rotated, the pin 28 will describe a circle and will in so doing cause the arm 27 to swing to and fro on its pivot pin 29. At the same time, the arm 27 through its pivotal connection 26 will cause the collar 24 to be rocked to and fro around the pivot 16.

During this oscillation, the two arms 25 will occupy alternately the extreme lateral positions shown in broken lines in Fig. 4. The arms 25 are constructed to represent springs in order to insure a resilient engagement with the lug 15.

The apparatus operates in the following manner:

When the photo-cell F is exposed to light, the pointer 3 will become deflected to a certain extent and will stop, for instance, in the position shown in Fig. 3. The diaphragm 19 of the photographic camera should now be adjusted in accordance with the intensity of the illumination to which the photo-cell has been exposed. To do this, the shaft 4 is rotated in the direction of the arrow 63. The arm 6 is thereby rocked forwardly to press the plate 7 thereof against the block 32 of the pointer 3. The front of the block 32 then bears against the pawl 9 standing opposite to it (see Fig. 2), and swings the pawl forwardly on its pivot 10. The extent to which the pawl 9 is deflected is readily apparent by comparing Fig. 1 with Fig. 2 and is only of such magnitude as to enable the lug 15 to be placed opposite to the pawl in the clearance between the pawl 9 and the segment 14. On the other hand, the measure of this deflection of the pawl 9 is sufficiently great to insure the end 64 of the pawl 9 being projected into the path of travel of the arms 25. Simultaneously with the deflection of the pawl 9 towards the front, the collar 24 will also be oscillated to and fro around the pivot 16. As long as the pawl 9 is pressed outwards towards the left (Fig. 2), the arms 25 are unable to oscillate beyond this pawl, as the end 64 of the pawl forms a stop against these arms in the path of travel of the latter. Supposing that before the operation was started, the position of lug 15 was as is shown by dotted lines 65 in Fig. 4. Then right-hand arm 25 will, when rocked towards the left, engage the lug 15 and carry the latter along with it until the arm 25 impacts against the deflected pawl 9. Movement of the lug 15 then ceases with the pin opposite to this deflected pawl 9. In case the illumination of the object to be photographed and accordingly also that of the photo-cell remains constant during the time of taking the photograph, the pointer 3 will remain standing still in its set position, and at each rotation of the shaft 4, it will always be the same pawl 9 which will be pressed out from its position of rest, so that the lug or pin 15 will be stopped in front of this pawl 9.

In the taking of a cinematographic picture with a cinematographic camera, the camera may be operated for a considerable length of time, during which time the illumination of the object of which a cinematographic picture is to be taken varies. If such variance occurs, the pointer 3 will after a few revolutions of the shaft 4 be adjusted in accordance with the variation of the illumination into the position 66 shown in Fig. 4 in dotted lines. Thereby the pawl 9 in Fig. 2 is released so that the spring 11 will return it into its position of rest (Fig. 1). On the other hand, it is now the pawl 67 of Fig. 3 which will be pressed out and it is this pawl that will now form the stop for the path of travel of the arms 25. The arm 25 becoming deflected towards the left will at its next travel carry the lug or pin 15 behind the latching pawl 67. Thereby the adjusting ring of the diaphragm 17 will, through the system of teeth of the segment 14, become deflected, this deflection being such as to vary the diaphragm opening to correspond to the variation of the illumination.

It appears from the above that the device described will in each case adjust the diaphragm in accordance with the illumination of the object of which a picture is to be taken. The necessary preliminary condition for this is that the shaft 4 should be rotating. The shaft 4 may, for instance, in the case of cinematographic cameras, be coupled with the clockwork or with the shaft of the turning handle. Or, in the case of ordinary photographic cameras for producing stationary pictures in the camera, a special mechanical or electrical drive may be provided for the purpose of rotating the shaft 4.

Attention is directed to the fact that in my invention, the necessary adjustment is made without subjecting the pointer or the coil 2 of delicate construction and its bearings 31 to any strain or impact. Instead, an intermediate pawl member 9 which is non-sensitive to impacts will be subjected to any stresses by the forces set free at the impact of the adjusting device 25. Consequently, the accurate operation of the device over long periods of use is possible.

In the embodiment of Figs. 1 to 4, the displacement of the block 32 will subject the pointer 3 of the measuring instrument to a forward and backward bending stress. Should this stress be disadvantageous, it is possible to avoid it in the manner shown in the embodiment of Figs. 5–8. According to this embodiment, the pointer 103 is likewise fitted with a block 132. This block, however, is located between two pressing plates 37 and 38 which are capable of alternating motion in the directions of the arrows 68 and 69, respectively. For this purpose, the pressing plates 37 and 38, visible in side elevation in Fig. 8, are fitted respectively with slide-blocks 39 and 40, which slide-blocks carry rollers 42 and 43, respectively. Each of the slide-blocks 39 and 40 is guided in a slot 41 (Fig. 6) in fixed plates 53. Each pair of rollers 42 and 43 is situated in a cam slot 45 in the opposite vertical walls of a frame 44. The frame 44 is guided for movement in a straight line horizontally in fixed carrying members 48 by means of pins 47 and alternating right and left movement is imparted to it by the shaft 4 by means of an eccentric 49 carried thereby. The magnet 1 of the measuring instrument is constructed, together with the coil 2, in a manner similar to that shown in Fig. 1 and is fixed in a rotatable manner on the camera wall 51 (Fig. 7) by means of a bracket 50 and a pin 52.

An arcuate series of pins 46 is arranged opposite to the block 132 of the pointer 103 in the pressing plate 37 so as to be displaceable. It is opposite to these pins that the series of pawls 109 loaded by the spring 111 are situated. These pawls are constructed and arranged in the same manner as has been already described with reference to Figs. 1–4.

As the arrangement according to Figs. 5 to 8 operates in a manner different from the embodiment according to Figs. 1 to 4, this method of operation is described as follows: When rotating the shaft 4, the frame 44 will be alternately raised and lowered by the eccentric 49. At each raising of the frame 44, the two rollers 42 and 43 are separated further apart by the cam 100 (Fig. 6). On the other hand, at each lowering of the frame, the two rollers approach each other in accordance with the shape of the cam 100 and slot 45. At each mutual approach of the rollers 42 and 43, the pointer 103 is engaged first and supported on its rear face by the plate 38. The slot 45 and cam 100 are so shaped that the pressing plate 37 will take longer to contact the pointer 103 than will the pressing plate 38. The peg 46 projecting through the plate 37 will become supported against the block 132 of the pointer and will subsequently, during the further displacement of the pressing plate 37, deflect the pawl 109 towards the front (Fig. 5). In this position of the pawl 109, the latter will project into the path of travel of the arms 25 in the same way as has already been described above with reference to the Figs. 1 to 4. As the frame 44 is alternately raised and lowered, the pawls 109 are also, in the same way as in the case of the first embodiment, alternately pressed into and out of the path of travel of the arms 25 again by the spring 111.

The bracket 50 together with the magnet 1 are capable of being angularly deflected. The purpose of this arrangement is to enable the fundamental position of the instrument to be adjusted in dependence upon some factor determining proper exposure. For this purpose, the bracket 50 is fitted with a system of teeth 55 arranged on the right-hand end thereof (Fig. 8). The teeth 55 engage the teeth of a gear wheel 54. The gear wheel 54 is rotatable around the axle 70 by means of the pointer 56. The pointer 56 moves in front of a fixed scale 57 fixed on the casing of the apparatus. Should it be desired to alter the fundamental position of the measuring instrument, for instance, in dependence of the sensibility of the emulsion employed in each case, the scale will be divided, for instance, according to Scheiner degrees or HD degrees. The scale can, however, also be fitted with a division according to the color filter used or the like.

In this embodiment, the pointer 103 is likewise protected against the mechanical shocks of the adjusting device and, in addition, the pointer is also released from any such back and forward bending moments as occur in the device of Figs. 1 to 4. In other respects, the automatic and current adjustment of the diaphragm opening takes place in this embodiment in the same way as in the embodiment of Figs. 1 to 4.

Both embodiments have been described for the adjustment of the diaphragm of a photographic camera. It is, however, also possible to employ the device for the adjustment of other elements influencing the exposure of the film or plate. For instance, the device described can also be used for adjusting the shutter speed. Moreover, it is also possible to effect the automatic adjustment of the diaphragm, as well as of the shutter, by utilizing two separate devices according to the invention in the same camera.

I claim:

1. A photographic camera including a lens, means for regulating the amount of light passing through said lens, a photo-electric exposure meter in said camera, said meter having an indicating pointer swingable along a definite path, driving means for adjusting said regulating means in accordance with the light values of the object as indicated by said meter, a plurality of normally inoperative stops each being movable to an operative position to limit the adjustment of said regulating means to conform to the light value of the object, said stops being arranged adjacent said pointer along said path of travel of the same, and means moving said pointer to actuate the nearest stop into an operative position and at the same time actuate said adjusting means.

2. A photographic camera including a lens, means for regulating the amount of light passing through said lens, a photo-electric exposure meter in said camera, said meter having an indicating pointer swingable along a definite path, driving means for adjusting said regulating means in accordance with the light values of the object as indicated by said meter, a plurality of normally inoperative stops each being movable to an operative position to limit the adjustment of said regulating means to conform to the light value of the object, said stops being arranged adjacent said pointer along said path of travel of the same, and means moving said pointer to actuate the nearest stop into an operative position and at the same time actuate said adjusting means, said adjusting means including a pair of spaced arms respectively engageable with opposite sides of an operatively positioned stop.

3. A photographic camera including a lens, means for regulating the amount of light passing through said lens, a photo-electric exposure meter in said camera, said meter having an indicating pointer swingable along a definite path, driving means for adjusting said regulating means in accordance with the light values of the object as indicated by said meter, a plurality of normally inoperative stops each being movable to an operative position to limit the adjustment of said regulating means to conform to the light value of the object, said stops being arranged adjacent said pointer along said path of travel of the same, and means moving said pointer to actuate the nearest stop into an operative position and at the same time actuate said adjusting means, said adjusting means including a pair of spaced and resilient arms respectively engageable with opposite sides of an operatively positioned stop.

4. A photographic camera including a lens, means for regulating the amount of light passing through said lens, a photo-electric exposure meter in said camera, said meter having an indicating pointer swingable along a definite path, means for actuating said regulating means, a drive lug on said last named means, drive means alternately engageable with either side of said lug to drive said actuating means in both directions, a plurality of normally inoperatively positioned stops arranged adjacent said pointer along the path of travel of the same, each of said stops being selectively movable to an operative position to limit the movement of said drive means, and means moving said pointer to actuate the stop nearest thereto into an operative position and at the same time actuate said drive means.

5. A photographic camera including a lens, means for regulating the amount of light passing through said lens, a photo-electric exposure meter in said camera, said meter having an indicating pointer swingable along a definite path, said regulating means including a ring gear for operating the same, a toothed segment engageable with said gear to actuate the same, a drive lug on said segment, drive means alternately engageable with either side of said lug to drive said segment in both directions, a plurality of normally inoperatively positioned stops arranged adjacent said pointer along the path of travel of the same, each of said stops being selectively movable to an operative position to limit the movement of said drive means, and means moving said pointer to actuate the stop nearest thereto into an operative position and at the same time actuate said drive means.

6. A photographic camera including a lens, means for regulating the amount of light passing through said lens, a photo-electric exposure meter in said camera, said meter having an indicating pointer swingable along a definite path, said regulating means including a ring gear for operating the same, a toothed segment engageable with said gear to actuate the same, a drive lug on said segment, drive means alternately engageable with either side of said lug to drive said segment in both directions, a plurality of normally inoperatively positioned stops arranged adjacent said pointer along the path of travel of the same, each of said stops being selectively movable to an operative position to limit the movement of said drive means, and means moving said pointer to actuate the stop nearest thereto into an operative position and at the same time actuate said drive means, said drive means comprising a pair of spaced and swingably mounted resilient arms.

7. A photographic camera including a lens, means for regulating the amount of light passing through said lens, a photo-electric exposure meter in said camera, said meter having an indicating pointer swingable along a definite path, said regulating means including a ring gear for operating the same, a toothed segment engageable with said gear to actuate the same, a drive lug on said segment, drive means alternately engageable with either side of said lug to drive said segment in both directions, a plurality of normally inoperatively positioned stops arranged adjacent said pointer along the path of travel of the same, each of said stops being selectively movable to an operative position to limit the movement of said drive means, and means moving said pointer to actuate the stop nearest thereto into an operative position and at the same time actuate said drive means, said last named means including a shaft, means for rotating said shaft, cam means on said shaft, means actuated by said cam means to engage said pointer to move the same, and an operative connection between said shaft and said drive means.

8. A photographic camera including a lens and means for regulating the amount of light passing through said lens, means for automatically adjusting said regulating means in accordance with the light values of the object to be photographed, said adjusting means including a light sensitive device having an indicator movable in a definite path by variations in said light values, driving means for adjusting said regulating means, a plurality of selectively movable stops for limiting the adjustment of said regulating means to conform to the light value of the object as indicated by said indicator, means for actuating a selected stop by said indicator, and drive means for actuating said adjusting means and at the same time actuating said indicator to actuate said selected stop, said stop actuating means comprising a swingably mounted member mounting said stops, said member being swingable towards and away from said indicator, a displaceable element carried by said member adjacent each stop, said elements being between said stops and said indicator, one of said elements being engageable with one side of said indicator as said member is swung towards the same, said element being displaced to actuate its stop upon further swinging of said member towards said indicator.

9. A photographic camera including a lens and means for regulating the amount of light passing through said lens, means for automatically adjusting said regulating means in accordance with the light values of the object to be photographed, said adjusting means including a light sensitive device having an indicator movable in a definite path by variations in said light values, driving means for adjusting said regulating means, a plurality of selectively movable stops for limiting the adjustment of said regulating means to conform to the light value of the object as indicated by said indicator, means for actuating a selected stop by said indicator, drive means for actuating said adjusting means and at the same time actuating said indicator to actuate said selected stop, said stop actuating means comprising a swingably mounted member mounting said stops, said member being swingable towards and away from said indicator, a displacement element carried by said member adjacent each stop, said elements being between said stops and said indicator, one of said elements being engageable with one side of said indicator as said member is swung towards the same, said element being displaced to actuate its stop upon further swinging of said member towards said indicator, and swingable means movable into engagement with the other side of said indicator before its engagement with said element to brace said indicator against the impact of said element.

10. A photographic camera including a lens and means for regulating the amount of light passing through said lens, means for automatically adjusting said regulating means in accordance with the light values of the object to be photographed, said adjusting means including a light sensitive device having an indicator movable in a definite path by variations in said light values, driving means for adjusting said regulating means, a plurality of selectively movable stops for limiting the adjustment of said regulating means to conform to the light value of the object as indicated by said indicator, means for actuating a selected stop by said indicator, drive means for actuating said adjusting means and at the same time actuating said indicator to actuate said selected stop, means for mounting said light sensitive device in said camera, and means for adjusting said light sensitive device on said mounting to regulate the movements of said indicator to conform to the sensitivity of any of a plurality of emulsions of different sensitivity.

11. A photographic camera including a lens and means for automatically regulating the amount of light passing through said lens in accordance with the light values of the object to be photographed, a light sensitive device having an indicator movable in a definite path by variations in said light values, means for adjusting said regulating means, a plurality of independently movable stops individually movable into position for limiting the adjustment of said regulating means, said stops being spaced adjacent the path of said indicator, means cooperating with said indicator for moving a stop corresponding to the position of the indicator and drive means for actuating said adjusting means and at the same time actuating said stop moving means.

12. A photographic camera including a lens and means for automatically regulating the amount of light passing through the lens in accordance with the light value of the object to be photographed comprising a plurality of independently movable stops, a light sensitive device for selecting one of said stops corresponding to the light value, means adjustable in position to regulate the transmission of light through the lens, means for moving the selected stop to operative position and means for moving said adjustable means to a position determined by said selected stop.

13. In a photographic camera in which a device including a light sensitive cell and an electric meter having a pivoted pointer controls the setting to which an exposure control device of the camera may be adjusted, means for angularly adjusting said meter about the axis of its pointer pivot with respect to the camera, whereby the same position of the pointer relative to the meter can be made to provide a different setting of the exposure control device.

ÖDÖN RISZDORFER.